(12) United States Patent
Krimmer

(10) Patent No.: US 6,256,765 B1
(45) Date of Patent: Jul. 3, 2001

(54) METHOD FOR CHECKING GROUPS OF DATA FORMED FROM A PLURALITY OF BYTES

(75) Inventor: Roland Krimmer, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/163,616

(22) Filed: Sep. 30, 1998

(30) Foreign Application Priority Data

Sep. 30, 1997 (DE) .............................................. 197 43 239

(51) Int. Cl.[7] .................................................. H03M 13/00
(52) U.S. Cl. ............................................ 714/807; 714/758
(58) Field of Search ........................ 340/146.1; 714/781, 714/807, 758, 785, 808

(56) References Cited

U.S. PATENT DOCUMENTS

| 3,573,726 | * | 4/1971 | Towell ............................... 340/146.1 |
| 4,723,244 | * | 2/1988 | Iacoponi ............................... 714/781 |
| 5,121,396 | * | 6/1992 | Irvin et al. ........................... 714/807 |
| 5,935,268 | * | 8/1999 | Weaver ................................ 714/758 |

OTHER PUBLICATIONS

Japanese Abstract JP 64–88 818 A.

* cited by examiner

Primary Examiner—Albert Decady
Assistant Examiner—David Ton
(74) Attorney, Agent, or Firm—Bell, Boyd & Lloyd LLC

(57) ABSTRACT

In connection with the checking of data stocks by check sum formation (e.g. CRC checking), subgroups of the data group being checked contain dummy bytes wherein, given desired modification of the individual bytes, the dummy bytes in relevant subgroups are modified such that an intermediate check sum remains unmodified.

3 Claims, 1 Drawing Sheet

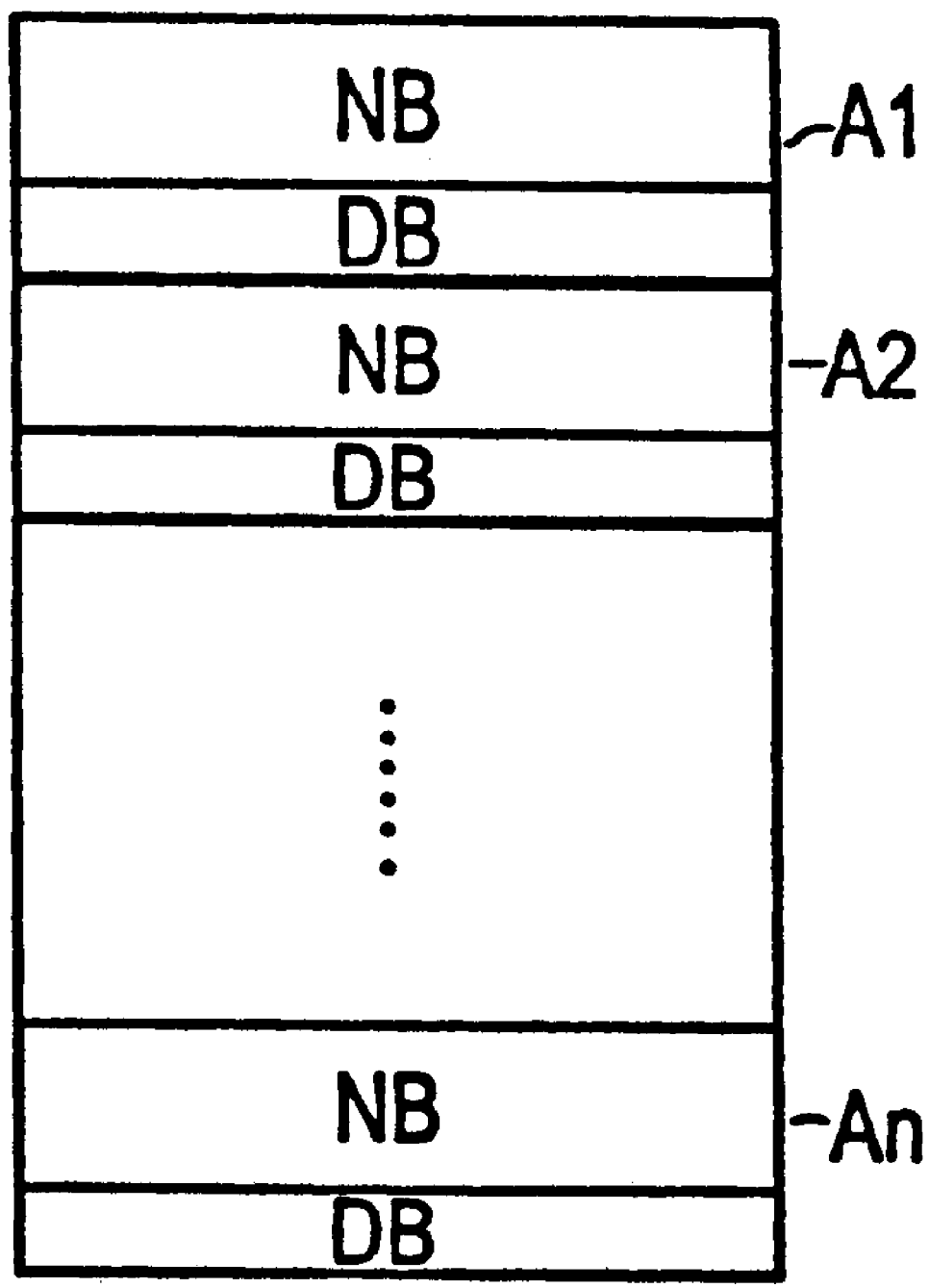

METHOD FOR CHECKING GROUPS OF DATA FORMED FROM A PLURALITY OF BYTES

BACKGROUND OF THE INVENTION

1. Field of the Invention

The present invention relates to a method for checking groups of data formed from a plurality of bytes according to which a characteristic check sum value is formed pursuant to a defined algorithm in a manner involving all bytes wherein the check result is obtained by checking a check sum word corresponding to the check sum value for the expected formation.

2. Description of the Prior Art

In connection with the checking of the contents of storage units of electronic modules which are described by a processor, such a check would progress such that the processor forms a check sum code word via the data delivered to the module. The module forms a check sum code word via the data stored in its storage unit and these check sum code words are compared.

If the electronic modules are a matter of modules of communications technology, then it is possible that the storage contents are intended to remain unmodified for a relatively long time in an undisturbed operation. It thus has to be permanently checked whether the stored data bytes are still contained in the original form. That is, following the initial writing-in, a check sum must be repeatedly formed by the module and compared to the originally determined check sum word in permanent fashion.

Previously, if individual bytes stored in the storage unit of the electronic module had to be modified on the basis of any sort of modification of the switching conditions, the course of action taken was to first execute a check sum formation over the entire new data stock not only by the processor but also by the module, and to then perform a check sum word comparison—as in the case of the first description.

Because of the great number of bytes to be taken into consideration in modern modules of complication technology, such check sum formations are relatively time-consuming. While this is not substantial for the modules themselves, in this context, the loading of the processor thus conditioned represents an undesirable dynamic load increase as this processor has to fulfil other tasks as well.

It is therefore an object of the present invention to propose a method for checking groups of data formed from a plurality of bytes wherein the method leads to more favorable relations in the context described above.

SUMMARY OF THE INVENTION

Such object is inventively achieved with a method wherein groups of data are split into subgroups whereby, in addition to the useful bytes, these subgroups contain auxiliary bytes which are also considered in the check sum formation. Given desired modifications of the useful bytes, the auxiliary bytes in the respectively relevant subgroup are modified such that an intermediate check sum formed with respect to the data of the subgroup remains unchanged. For the processor delivering the data, this means that a check sum formation required in connection with a data modification is only an intermediate check sum formation limited to a fraction of the total data, requiring only a tenth of the previous time outlay, for example.

The check sum formation and the intermediate check sum formation occur in the form of a modulo summation or correspond to what is known as the CRC algorithm (Cycling Redundancy Check).

Additional features and advantages of the present invention are described in, and will be apparent from, the Detailed Description of the Preferred Embodiments and the Drawings.

DESCRIPTION OF THE DRAWINGS

FIG. 1 shows the layout of a storage unit, e.g. a RAM of a communication module, which is inventively split into sections A1 to An. Besides the useful bytes DB NB, each storage section contains auxiliary data (dummy bytes).

DETAILED DESCRIPTION OF THE PREFERRED EMBODIMENTS

If a byte or a plurality of bytes of section A2 is to be modified, for example, the processor is modified corresponding to a suitable algorithm of one or more of the auxiliary data bytes such that the intermediate sum valid for this section remains unchanged. The processor thus needs to process only a relatively small number of bytes compared to the total data stock. If the entry succeeds in orderly fashion, the check sum relevant to the entire data stock will remain unchanged and the check carried out by the module will bring a correspondingly positive result.

As indicated, in the formation of check sums and intermediate check sums, a modulo addition can be used wherein only those errors which modify the total data stock are detected. But a CRC check can also be utilized, by means of which errors consisting in an inversion of the sequence of data bytes in the storage unit also can be detected. The application to other check algorithms directed to the evaluation of a check sum is likewise conceivable.

Although the present invention has been described with reference to specific embodiments, those of skill in the art will recognize that changes may be made thereto without departing from the spirit and scope of the invention as set forth in the hereafter appended claims.

I claim as my invention:

1. A method for checking groups of data which are delivered to an electronic data storage unit via a processor and which are formed from a plurality of bytes, the method comprising the steps of:

forming a characteristic check sum value according to a defined algorithm in a manner involving all bytes in the electronic data storage unit;

obtaining a check result by checking a check sum word corresponding to the check sum value for an expected formation;

splitting the groups of data into a plurality of subgroups which each contain both useful bytes and auxiliary bytes that are taken into consideration in the check sum value formation; and modifying, given a desired modification of the useful bytes, at least one of the auxiliary bytes of a relevant subgroup wherein an intermediate check sum value, which is formed with respect to the data of the relevant subgroup according to the same algorithm as the check sum word, remains unmodified, such that the processor need only process a relatively small number of all the bytes when forming a characteristic check sum value in connection with the desired modification, and processor time outlay is minimized.

2. A method for checking groups of data as claimed in claim 1, wherein the algorithm for forming check sum values and intermediate check sum values is a modulo summation.

3. A method for checking groups of data as claimed in claim 1, wherein the algorithm for forming check sum values and intermediate check sum values is a CRC (Cycling Redundancy Check) algorithm.

* * * * *